United States Patent [19]

Peterson

[11] 4,221,307
[45] Sep. 9, 1980

[54] METHOD AND APPARATUS FOR MATERIAL HANDLING

[75] Inventor: Loren N. Peterson, Salina, Kans.

[73] Assignee: Salina Vortex Conveyor Corporation, Salina, Kans.

[21] Appl. No.: 962,915

[22] Filed: Nov. 22, 1978

[51] Int. Cl.$^2$ .................... G01F 11/28; F16K 3/00
[52] U.S. Cl. .................... 222/428; 222/450; 251/327; 251/328; 251/174; 251/175; 251/368
[58] Field of Search .............. 222/426, 427, 428, 430, 222/450; 251/327, 328, 174, 175, 368

[56] References Cited

U.S. PATENT DOCUMENTS

| | | | |
|---|---|---|---|
| 2,342,482 | 2/1944 | Ohlinger | 222/427 |
| 2,763,418 | 9/1956 | Hill | 222/426 X |
| 3,273,855 | 9/1966 | Wells | 251/328 |
| 3,348,567 | 10/1967 | Volpin | 251/327 X |
| 3,367,625 | 2/1968 | Fortune | 251/327 X |
| 3,446,476 | 5/1969 | Scaramucci | 251/328 X |
| 3,918,471 | 11/1975 | Bedner | 251/327 X |
| 4,130,136 | 12/1978 | Garnier et al. | 251/368 X |

*Primary Examiner*—Allen N. Knowles
*Attorney, Agent, or Firm*—Lowe, Kokjer, Kircher, Wharton & Bowman

[57] ABSTRACT

A knife gate for use in pneumatic conveying equipment is the subject of the present invention. The improved knife gate device is constructed utilizing first and second guide plates disposed in spaced apart relationship with a resilient member positioned behind each of the plates. Each plate is characterized by an opening and a planar surface extending on either side of the opening. A reciprocating gate means is disposed between the plates and places the yieldable means under compression. The gate means has an opening and a planar surface extending on at least one side of the opening. The gate means is moveable between an open position wherein all of the openings are aligned and a closed position wherein the planar surface of the gate means moves past the openings in the guide plates to close the latter.

The invention also encompasses a flow control apparatus and method wherein two of the aforedescribed knife gate devices are positioned in spaced apart relationship with first and second holding areas located between the two knife gates. In this embodiment, the gate means and corresponding guide plates are each provided with dual openings for alignment with the respective holding areas. Means is provided for moving the gate means in alternating relationship so that when one of the openings in one of the gate means is in communication with one of the holding areas, the opposite opening in the other of the gate means is in communication with the other of the holding areas.

12 Claims, 6 Drawing Figures

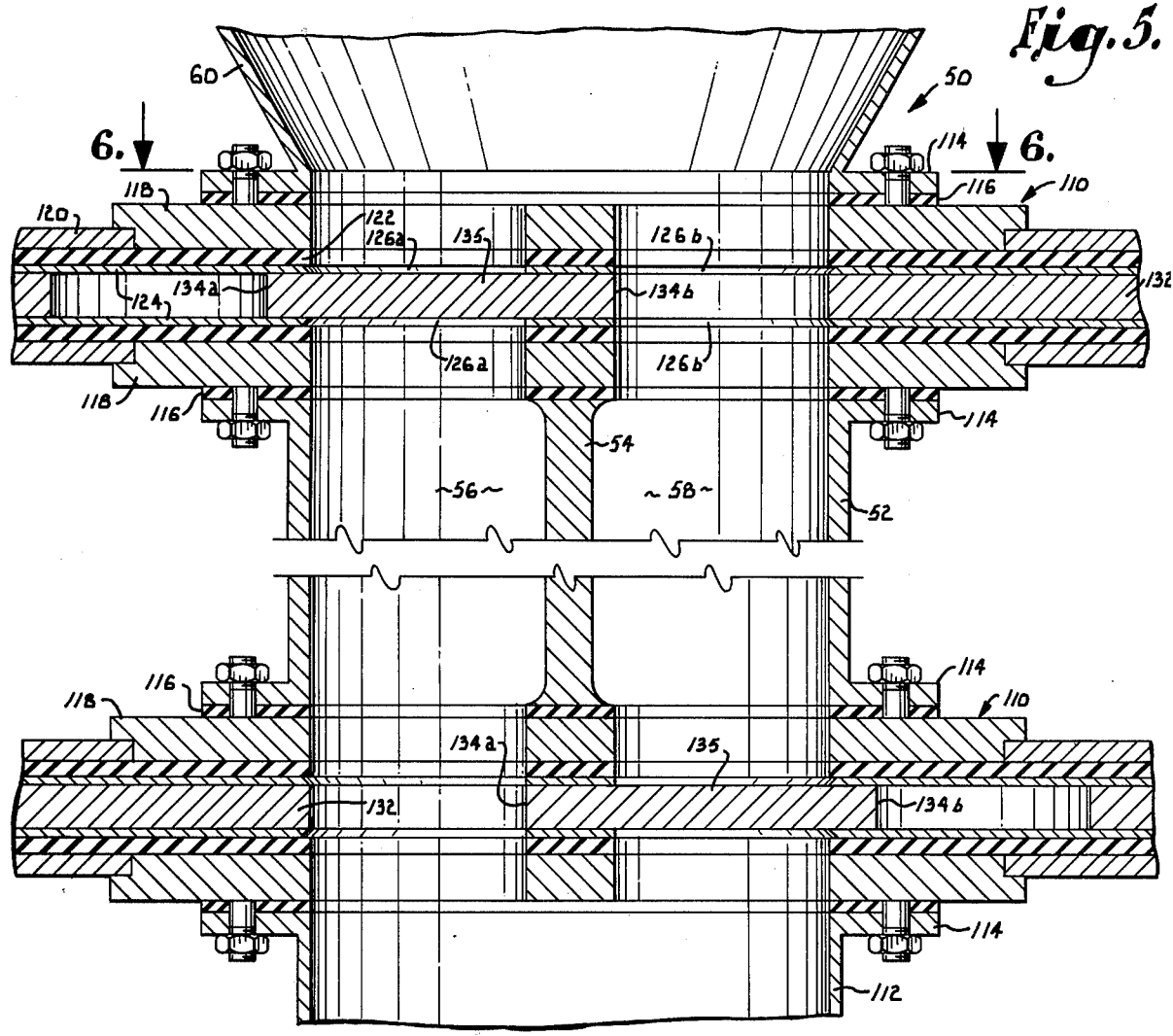
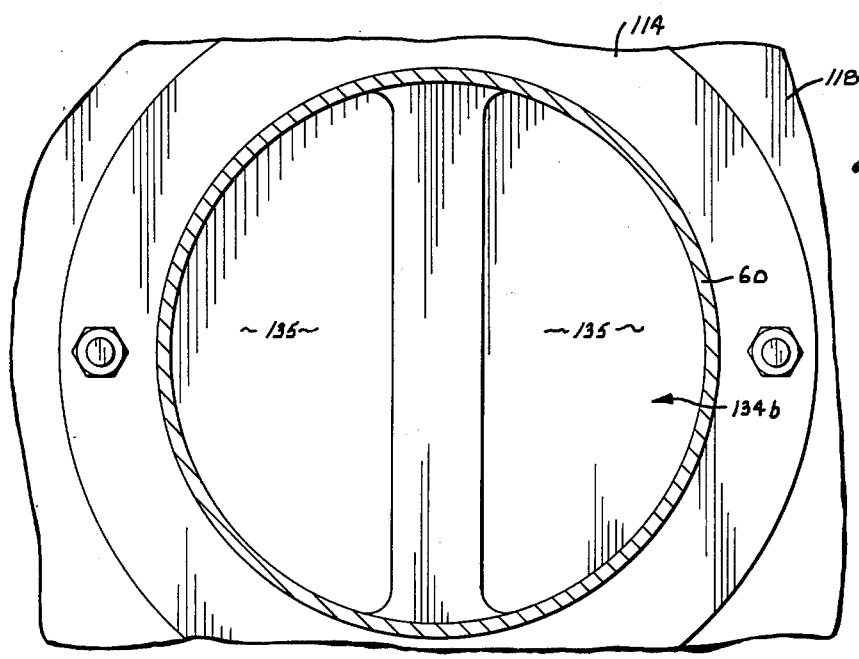

METHOD AND APPARATUS FOR MATERIAL HANDLING

This invention relates generally to material handling equipment and, more particularly, to a novel knife gate construction and to a method and device employing the novel knife gate construction.

It is well known in the material handling art to employ knife gates for the purpose of controlling material flow. A conventional knife gate will reciprocate between an open position allowing material flow to a closed position wherein the gate moves against a seal to close off material flow. A conventional knife gate construction is shown and described in U.S. Pat. No. 3,545,480. Other types of control devices commonly employed in pneumatic conveying include butterfly valves and rotary air locks.

It is a primary object of the present invention to provide a method and apparatus for material handling in a pneumatic conveying system, wherein material is passed from one location to another with less air loss than is typical with a conventional rotary air lock.

It is an important objective of this invention to provide a method and apparatus for transferring material in a pneumatic conveying system wherein semi-continuous flow of material through an air lock is possible.

An important aim of the invention is to provide a method and apparatus for use in a pneumatic conveying system to transfer material from one location to another wherein the chance of blockage from foreign objects is greatly reduced.

Still another one of the objects of the invention is to provide a method and apparatus for use in handling material in a pneumatic conveying system wherein all conventional seals are eliminated, thereby reducing greatly the possibility of the material being handled interferring with the seal which is provided by the apparatus.

An important aim of the invention is to provide a method and apparatus for handling material in a pneumatic conveying system wherein there is no possibility of the material bridging an opening to clog the system.

An important one of the objectives of my invention is to provide a method and apparatus for use as an air lock in a pneumatic conveying system, wherein greater efficiency in handling extremely light low-density powders is possible as a result of elimination of any possibility of the material clogging because of excess airflow through the system.

Still another one of the aims of my invention is to provide a method and apparatus for material handling in a pneumatic conveying system wherein material is transferred from one location to another and there is less frictional loss than with conventional rotary air lock, thereby resulting in less wear and lower energy requirements.

Yet another aim of the present invention is to provide a novel knife gate construction for use in material handling which will offer a better seal than with conventional knife gates by eliminating the need for the gate to abut a sealing member.

An important object of this invention is to provide a novel knife gate construction which has reduced wear over conventional constructions.

Still another one of the objects of my invention is to provide a novel knife gate construction which reduces the problems of foreign objects blocking the knife gate and virtually eliminates the problem of the material itself interferring with the knife gate seal.

It is also one of the objects of my invention to provide a novel knife gate construction which is more economical to manufacture than conventional constructions.

Other objects of the invention will be made clear or become apparent from the following description and claims when read in light of the accompanying drawings, wherein:

FIG. 5 is a vertical cross-sectional view illustrating a novel air lock and flow control device incorporating the knife gate construction of present invention; and FIG. 6 is a horizontal cross-sectional view taken along line 6—6 of FIG. 5.

Figure 1:
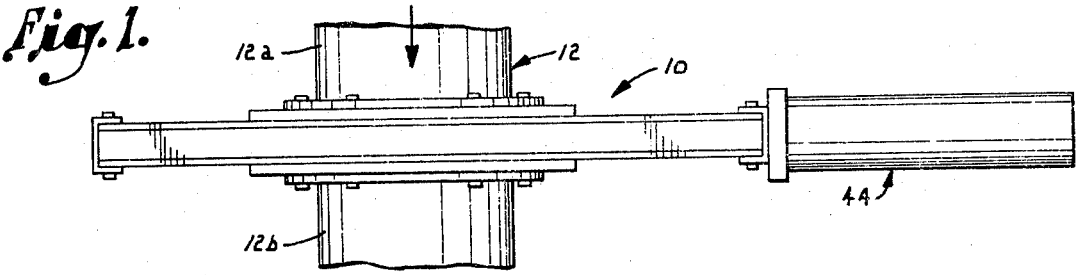
FIG. 1 is an elevational view of a knife gate constructed according to the present invention.

Referring initially to FIG. 1 the gate valve device of the present invention is designated generally by the numeral 10 and is positioned to intersect a conduit 12 having an upper section 12a and a lower section 12b.

Figure 2:
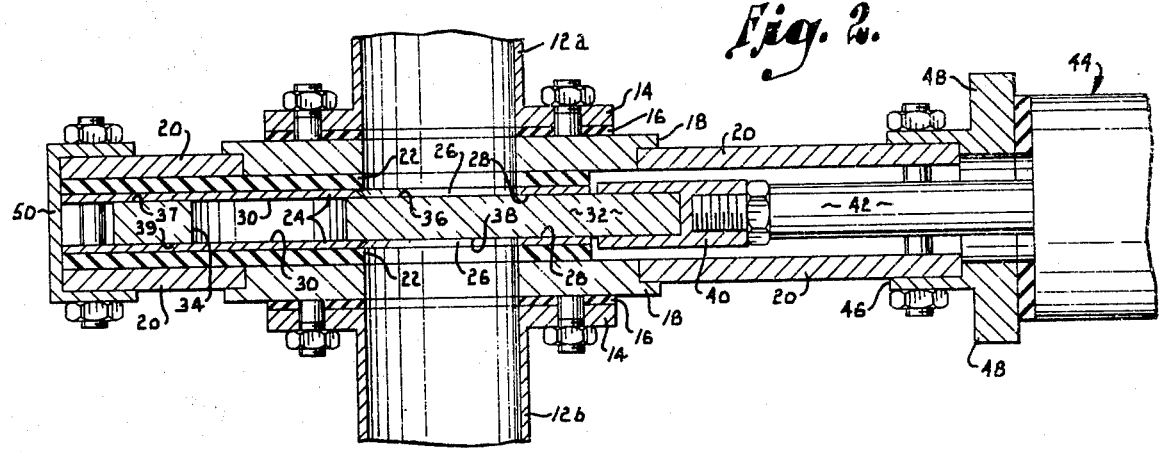
FIG. 2 is a vertical cross-sectional view of the knife gate shown in FIG. 1 on an enlarged scale.

Referring now to FIG. 2, each of the conduit sections 12a and 12b is characterized by a circumferentially extending flange portion 14 for securing device 10. Disposed in adjacent sealing relationship to each of the flanges 14 is a gasket 16. A flange plate 18 abuts each of the gaskets 16 and is configured to interlock with a cover plate 20 which surrounds plate 18.

A resilient compressible sealant sheet 22 is disposed in backing relationship to each flange plate 18 and each sheet 22 in turn forms a backing for a guide plate 24. It is to be noted that each of flange 14, gasket 16, flange plate 18 and sealant sheet 22 are characterized by an opening therethrough which openings are aligned to present a continuation of conduit 12. Similarily, each of guide plates 24 is provided with an opening 26 aligned with the aforedescribed openings so as to communicate with upper and lower conduit sections 12a and 12b, respectively. It is to be noted that each of guide plates 24 has a first planar surface 28 on one side thereof and a second and longer planar surface 30 on the opposite side.

Disposed between guide plates 24 is a reciprocating gate member 32 characterized by an opening 34 and planar surfaces 36 and 38 that extend away from opening 34 at one side. On the opposite side of opening 34 planar surfaces 37 and 39 are presented.

A threaded fitting 40 is rigid with gate member 32 at one end to provide a coupling for receiving the threaded end of a piston rod 42. Piston rod 42 is in turn coupled with an actuating cylinder designated generally by the numeral 44. An end cap 46 spans the distance between cover plates 20 at one end and is provided with an opening for receiving piston rod 42. End cap 46 has a flange portion 48 which presents a mount for cylinder 44. At the opposite ends of cover plates 20 a channel member 50 spans the distance between the plates to form a second end cap for the assembly.

It is to be noted that the planar surfaces 28 and 30 of guide plates 24 as well as the planer surfaces 36 and 38 of gate member 32 are all covered with a layer of a self-lubricating resinous material such as that sold by the DuPont company under the registered trademark TEFLON. This coating is preferably applied utilizing thermal gasification to insure maximum penetration of the coating into the surface of the gate and the guide plates which will normally be constructed of steel. With such a construction as heretofore described it is possible to eliminate all conventional seals between the gate member and the opening which is being closed.

Figure 3:
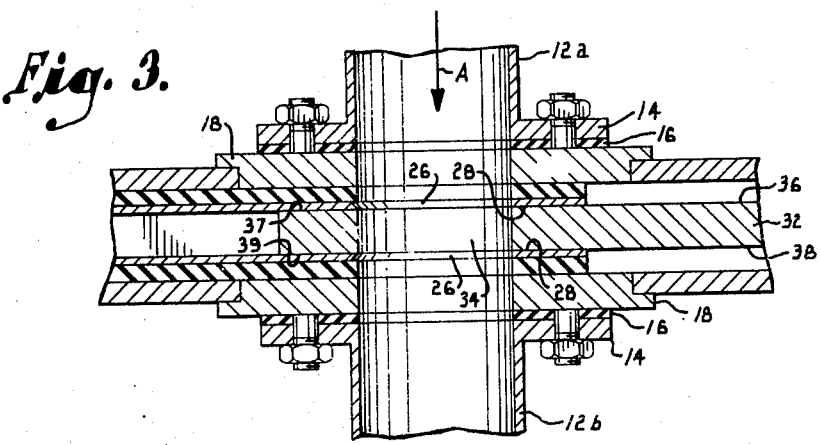
FIG. 3 is a vertical cross-sectional view of the knife gate shown in FIG. 2 moved to an open position.

Referring now to FIG. 3, gate member 32 is shown in its open position. In this position material is free to flow through conduit 12 as indicated by arrow A. Normally, of course, opening 34 in gate member 32 is of the same size as the cross-sectional dimension of conduit 12 so as to assure an unobstructed flow of material. The assembly is designed so that the insertion of gate 32 between guide plates 24 places sealant sheet 22 under compression so as to preclude any air loss in a pneumatic system during operation of device 10. With gate 32 in its open position planar surfaces 36 and 38 are placed in contiguous sealing relationship with planar surfaces 28 and planar surfaces 37 and 39 are in contiguous sealing relationship with planar surfaces 30. When cylinder 44 is actuated to move gate 32 to the left when viewing FIG. 3, the aforementioned planar surfaces will slide relative to each other to bring surfaces 36 and 38 into alignment with opening 26. The transverse dimension of surfaces 36 and 38 is greater than the corresponding dimension of conduit 12 and accordingly the stroke of piston rod 42 is longer than the transverse dimension of conduit 12 so that surfaces 36 and 38 are moved past the edge of openings 26 before movement is terminated. In this manner a shear action is utilized to close the opening which is in no way dependent upon an abutting seal being made as the gate is closed. The shear action between the planar surfaces of the gate members and the corresponding guide plates precludes any of the material being handled from interferring with opening or closing of the gates. It will also be appreciated that by employing this concept a more reliable seal is made when the gate is closed. Another advantage of the construction is that there is no contact point on which foreign objects may become lodged, thereby greatly reducing the possibility of a foreign object blocking the path of gate 32. Because of the elimination of conventional seals at the gate and any direct contact between a seal and the moving gate member the effective life of the gate device of the present invention is increased over conventional gate valves.

Figure 4:
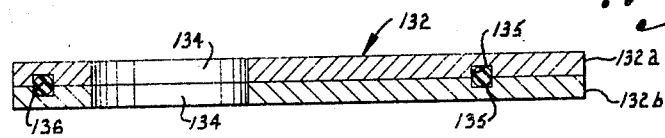
FIG. 4 is a fragmentary vertical cross-sectional view of an alternative embodiment for the gate portion of the device.

Referring now to FIG. 4, an alternative construction for gate member 32 is disclosed and is designated generally by the numeral 132. Gate 132 is constructed from two abutting planar members 132a and 132b. Each plate is characterized by a channel 135, which extends completely around the plate in spaced relationship to an opening 134 in each of the plates. Disposed within the recessed channel 135 is a yieldable sealing member 136. With the two plates 132a and 132b disposed in contiguous relationship member 136 will be held under slight compression. Gate 132 is coupled with actuating rod 42 in the same manner as described above for gate 32. The remaining components of the device are as heretofore described. The alternative construction 132 for the gate member is utilized where extremely high differential pressures exist on opposite sides of the gate. The relatively high pressure on one side will cause some air to pass between the two plates 132a and 132b at openings 134. This high pressure air will enter recessed channels 135, causing plates 132a and 132b b to have a slight separation which will be facilitated by the compressed sealing member 136. Once this separation of the two plates occurs the effective seal between the gate member and the adjacent guide plates will be enhanced to preclude air loss.

Referring now to FIGS. 5, and 6 of the drawing, a novel air lock apparatus utilizing the device 10 of the present invention is illustrated. The device shown in FIG. 5 comprises an air lock designated generally by the numeral 50 having an enclosed housing 52 with a divider wall 54 extending through its center to present first and second holding areas 56 and 58. A modified gate device 110 is disposed above housing 52 and a second device 110 is disposed below housing 52. Disposed above the uppermost gate device 110 is a hopper 60 and disposed below lower gate device 110 is a conduit 112. Flanges 114 on the housing 52, the conduit 112 and hopper 60 provide means for securing gate devices by utilizing nuts and bolts in the same manner as previously shown and described for gate device 10 and conduit 12.

As the two modified gate devices 110 are identical in construction only one will be described in detail. A sealing gasket 116 is located between flanges 114 and flange plates 118. A cover plate 120 is placed in interlocking relationship with flange plate 118 and a sealant sheet 122 is sandwiched between plates 118, 120 and guide plates 124. Two spaced apart openings 126a and 126b are located in each of the guide plates and these openings are of the same dimension and are aligned with corresponding openings in the sheet 122, plate 118, gasket 116, and associated conduit and hopper structures.

Gate member 132 is identical in construction to gate member 32 previously described, except that two openings 134a and 134b are provided and are separated by a planar portion 135, the transverse dimension of which is greater than the corresponding dimension of openings 126a and 126b. Air lock 50 will normally be utilized to transfer materials such as grain. in a pneumatic conveying from one location to another. To this end, gate members 132 are operated in reciprocating differential relationship so that when one of the holding areas 56 is closed to the inflow of material from hopper 60 as a result of portion 135 blocking the opening, the other area 58 is open to material inflow. This position is maintained until holding area 58 is full, at which time the relative positions of the two gates 132 will be reversed so that area 58 will be closed to the inflow of material and opened to the outflow of material into conduit 112. Simultaneously area 56 is opened to the inflow of material from hopper 60 and closed to the outflow of material to the conduit 112. It is of course desirable to operate gates 132 with a quick acting movement to minimize air losses. Utilizing the apparatus of the invention, a substantially continuous flow of material into conduit 112 is possible with less air loss and lower energy requirements than with a conventional rotary air lock. It is also within the scope of the invention to make planar portion 135 of gates 132 approximately twice the width shown in FIG. 5 so that portion 135 may be used to block both openings 126a and 126b simultaneously. The upper gate 132 may then be operated slightly ahead of lower gate 132 to preclude the loss of any air except that equal to the volumetric displacement with areas 56 and 58. Manifestly, this will also require that the stroke of the actuating cylinders be doubled over the stroke required for operating the gates 132 as shown.

While the present invention has been described with regard to controlling the flow of material by moving gate devices 10 and 110 between open and closed positions, it is to be understood that in some applications an infinitely variable positioning control will be employed for use in regulating material flow through partially opening and partially closing the gate devices. With an air lock constructed according to the present invention there is also minimal danger of foreign objects becoming lodged in the device since even if a large foreign object enters one of the holding areas 56 or 58, it will have a tendency to drop through rather than remain.

I claim:

1. A device for use in controlling material flow between first and second areas, said device comprising:
   first and second guide plates each having an opening communicating with an adjacent one of said areas and a planar surface extending on either side of said opening;
   gate means disposed between said plates, said gate means having an opening and a planar surface extending on at least one side of said opening,
   said gate means being movable from an open position wherein all of said openings are aligned to a closed position wherein the planar surface of said gate means moves past said openings in said guide plates to close said guide plate openings;
   resilient compressible sheet means substantially coextensive with and disposed in backing relationship to each of said guide plates,
   each of said sheet means having an opening coextensive with the opening in a corresponding guide plate; and
   means for effecting movement of said gate means.

2. The invention of claim 1, wherein said gate means is disposed for rectilinear movement between open and closed positions and wherein is included power means for effecting said movement.

3. The invention of claim 1, wherein each of said areas is presented by a conduit presenting a common material pathway, said openings in said plates and said gate openings being approximately equal in area to the cross-sectional area of said pathway, said gate means being movable over a path greater in length than the transverse dimension of said pathway.

4. The invention of claim 1, wherein said planar surfaces of said guide plates and said planar surface of said gate means are characterized by having a layer of a self-lubricating resinous coating.

5. Flow control apparatus for use in material handling, said apparatus comprising:
   first and second guide plates each having side-by-side openings, a first planar surface extending between said openings and another planar surface extending away from each opening;
   first gate means disposed between said first and second plates, said first gate means having first and second spaced apart openings and a planar blocking surface therebetween,
   said first gate means being movable from a first position wherein said planar blocking surface is aligned with one set of openings in said first and second guide plates and one of said gate openings is aligned with the other set of openings in said first and second guide plates to a second position wherein said planar blocking surface is aligned with the other set of first and second guide plate openings and the other of said gate openings is aligned with said one set of first and second guide plate openings;
   third and fourth guide plates each having side-by-side openings, a first planar surface extending between said openings and another planar surface extending away from each opening;
   second gate means disposed between said third and fourth plates, said second gate means having first and second spaced apart openings and a planar blocking surface therebetween,
   said second gate means being movable from a first position wherein said planar blocking surface is aligned with one set of openings in said third and fourth guide plates and one of said gate openings is aligned with the other set of openings in said third and fourth guide plates to a second position wherein said planar blocking surface is aligned with the other set of third and fourth guide plate openings and the other of said gate openings is aligned with said one set of third and fourth guide plate openings;
   means for defining first and second holding areas between said first and second gate means, one of said holding areas being aligned with one set of openings in both said first and second and third and fourth guide plates and the other of said holding areas being aligned with the other set of openings in both said first and second and third and fourth guide plates; and
   means for moving said first and second gate means in alternating relationship whereby when one of the openings in one of said gate means is in communication with one of said holding areas the opposite opening in the other of said gate means is in communication with the other of said holding areas.

6. Apparatus as set forth in claim 5, wherein is included yieldable means disposed in backing relationship to each of said guide plates and wherein said plates compress said yieldable means upon positioning of said gates between said plates.

7. Apparatus as set forth in claim 6, wherein the surfaces of said gates and said guide plates which are in contact with one another are characterized by having a layer of self-lubricating resinous coating.

8. Apparatus as set forth in claim 5, wherein each of said gate means comprises first and second members disposed in contiguous relationship, at least one of said members characterized by a recessed area extending around the gate opening and in facing relationship to the other of said members, resilient means disposed under compression in said recessed area.

9. A device for use in controlling material flow between first and second areas, said device comprising:
   first and second guide plates each having an opening communicating with an adjacent one of said areas and a planar surface extending on either side of said opening;
   gate means disposed between said plates,
   said gate means comprising first and second planar members disposed in contiguous relationship, at least one of said members characterized by a recessed area extending around the gate opening and in facing relationship to the other of said members, and resilient means disposed under compression in said recessed area, said members having aligned openings presenting a passageway through said gate and said members presenting a planar surface extending on at least one side of said passageway, said gate means being movable from an open position wherein all of said openings are aligned to a closed position wherein the planar surface of said gate means moves past said openings in said guide plates to close said guide plate openings; and means for effecting movement of said gate means.

10. The invention of claim 9, wherein is included yieldable means disposed in backing relationship to each of said guide plates and wherein said plates compress said yieldable means upon positioning of said gate between said plates.

11. The invention of claim 10, wherein each of said areas is presented by a conduit presenting a common material pathway, said openings in said plates and said gate openings being approximately equal in area to the cross-sectional area of said pathway, said gate means being movable over a path greater in length than the transverse dimension of said pathway.

12. The invention of claim 9, wherein said planar surfaces of said guide plates and said planar surfaces of said gate means are characterized by having a layer of self-lubricating resinous coating.

* * * * *